United States Patent
Javan et al.

(10) Patent No.: US 9,894,856 B2
(45) Date of Patent: Feb. 20, 2018

(54) CULTIVATION, HARVESTING AND PROCESSING OF FLOATING AQUATIC SPECIES WITH HIGH GROWTH RATES

(75) Inventors: Adam Javan, Melbourne, FL (US); William Grieco, Melbourne, FL (US); Hector J Cumba, Palm Bay, FL (US); Harvey Weaver, Okeechobee, FL (US); Brian Lovas, Palm Bay, FL (US)

(73) Assignee: Parabel Ltd., Grand Cayman (KY)

( * ) Notice: Subject to any disclaimer, the term of this patent is extended or adjusted under 35 U.S.C. 154(b) by 637 days.

(21) Appl. No.: 13/265,525

(22) PCT Filed: Apr. 20, 2010

(86) PCT No.: PCT/US2010/031811
§ 371 (c)(1),
(2), (4) Date: Feb. 6, 2012

(87) PCT Pub. No.: WO2010/123943
PCT Pub. Date: Oct. 28, 2010

(65) Prior Publication Data
US 2012/0117869 A1    May 17, 2012

Related U.S. Application Data

(60) Provisional application No. 61/171,036, filed on Apr. 20, 2009.

(51) Int. Cl.
*A01G 33/00* (2006.01)
(52) U.S. Cl.
CPC .................. *A01G 33/00* (2013.01)

(58) Field of Classification Search
CPC ...... C12M 21/02; C12M 23/18; C12M 27/20; C12M 23/56; C12M 23/02; C12N 1/12; C02F 3/32; A01G 33/00; A01G 7/00; A01K 61/00
USPC .............................................. 47/14
See application file for complete search history.

(56) References Cited

U.S. PATENT DOCUMENTS

| | | | | | |
|---|---|---|---|---|---|
| 2,867,945 | A | * | 1/1959 | Gotaas | A01G 33/00 210/611 |
| 3,468,057 | A | * | 9/1969 | Buisson | A01G 7/02 435/257.1 |
| 3,768,200 | A | * | 10/1973 | Klock | A01G 33/00 210/602 |
| 3,839,198 | A | * | 10/1974 | Shelef | B01F 3/04765 210/150 |
| 3,955,318 | A | * | 5/1976 | Hulls | C02F 3/006 210/602 |
| 4,005,546 | A | * | 2/1977 | Oswald | C02F 3/32 210/602 |

(Continued)

OTHER PUBLICATIONS http://www.aquaponics.net.au/sites10.html, Murray Hallam, Practical Aquaponics for Everyone, Wayback Machine Dec. 2008, 3 pages.*

(Continued)

*Primary Examiner* — Monica Williams
(74) *Attorney, Agent, or Firm* — Baker & McKenzie LLP (57) ABSTRACT

Disclosed herein is a system of culturing and harvesting floating aquatic species with high growth rates. Also disclosed is a method of culturing and harvesting floating aquatic species using such a system.

17 Claims, 10 Drawing Sheets

(56) References Cited

U.S. PATENT DOCUMENTS

| | | | |
|---|---|---|---|
| 4,077,158 A * | 3/1978 | England | A01G 31/02 119/200 |
| 4,137,868 A * | 2/1979 | Pryor | A01K 61/00 119/212 |
| 4,253,271 A * | 3/1981 | Raymond | A01G 9/243 210/221.2 |
| 4,516,528 A * | 5/1985 | Jones | 119/226 |
| 4,910,912 A * | 3/1990 | Lowrey, III | 47/62 R |
| 5,121,708 A * | 6/1992 | Nuttle | A01G 31/02 119/200 |
| 5,269,819 A | 12/1993 | Porath | |
| 5,527,456 A * | 6/1996 | Jensen | 210/170.01 |
| 5,659,977 A * | 8/1997 | Jensen | A01G 33/00 34/547 |
| 8,245,440 B2 * | 8/2012 | Ryan et al. | 47/62 C |
| 8,287,740 B2 * | 10/2012 | Newman et al. | 210/747.5 |
| 2007/0048859 A1 * | 3/2007 | Sears | 435/289.1 |
| 2007/0151522 A1 | 7/2007 | Brauman | |
| 2008/0155890 A1 | 7/2008 | Oyler | |
| 2010/0162620 A1 * | 7/2010 | McCaffrey et al. | 47/1.4 |

OTHER PUBLICATIONS

Https://jeremybiggs.wordpress.com/2008/10/28/duck-attack/, The Garden Pond Blog, Oct. 2008, 2 pages.* http://collections.infocollections.org/ukedu/en/d/Jii23we/9.1.html, Workshop to produce an Information Kit on Farmer-proven integrated agriculture-aquaculture technologies, IIRR; 1992, 10 pages.*

Pedroni et al., A Proposal to Establish International Network on Biofixation of $CO_2$ and Greenhouse Gas Abatement with Microalgae, Journal of Energy and Environmental Research, vol. 1, No. 1, Nov. 2001.*

Examination Report, mailed in related Chinese Patent Application No. 201080023569.X, dated Sep. 20, 2012.

* cited by examiner

DETAIL A
SCALE 1 / 125
Paddlewheels & Support Platforms

Figure 5

DETAIL B
SCALE 1 / 125
Drain Sumps

Figure 6

DETAIL C
SCALE 1 / 75
Floating Windbreaks

Figure 7

DETAIL D
SCALE 1 / 75
Floating Harvesting Skimmer

CULTIVATION, HARVESTING AND PROCESSING OF FLOATING AQUATIC SPECIES WITH HIGH GROWTH RATES

CROSS-REFERENCE TO RELATED APPLICATIONS

The present application is a U.S. National Stage entry under 35 U.S.C. § 371 of International Application No. PCT/US2010/031811, filed on Apr. 20, 2010, designating the United States of America and published in English on Oct. 28, 2010, which in turn claims priority to U.S. Provisional Application No. 61/171,036, filed on Apr. 20, 2009, each of which is hereby incorporated by reference in its entirety.

PRIORITY CLAIM

This application claims the benefit of U.S. Provisional Application Ser. No. 61/171,036 (entitled "CULTIVATION, HARVESTING AND PROCESSING OF FLOATING AQUATIC SPECIES WITH HIGH GROWTH RATES"), filed on Apr. 20, 2009, which is incorporated herein by reference in its entirety.

BACKGROUND

Field

The present invention relates generally to the cultivation and processing of small aquatic photosynthetic organisms such as algae, aquatic species, and the like, including the small aquatic plant floating aquatic species such as duckweeds.

Description of Related Art

Lemnaceae is a family of flowering plants, also known as the duckweed family, as it contains the duckweeds or water lentils. Duckweeds include the genera *Spirodela, Landoltia, Lemna, Wolffia*, and *Wolfiella*. Duckweeds are fast-growing, high-protein-yielding, and high-pigment-containing monocotyledonous plants and are classified as macrophytes. There are greater than forty species of duckweed worldwide, but they are most abundantly found in moderate climates of tropical temperate zones. When confronted with temperatures below about twenty degrees Celsius, duckweed plants form a non-buoyant structure called a turion, which sinks to the bottom of the pond and remains dormant until warmer conditions return.

Duckweed is an important food source for waterfowl and is eaten by humans in some parts of Southeast Asia. Duckweed additionally provides shelter for a number of water species, such as frogs and fish, while simultaneously aiding in bioremediation of its native environment by absorbing excess mineral nutrients, particularly nitrogen and phosphates. Duckweed grown on sewage or animal wastes normally does not contain toxic pollutants and can be fed to fish or to livestock, or spread on farmland as fertilizer. However, duckweed that is to be used for human or animal consumption involves a retention period in clean water to ensure that the biomass is free of water-borne pathogens. Duckweed and *lemna* are used interchangeably in the application.

SUMMARY

Some embodiments include a method of culturing floating aquatic species comprising: providing water from a water source, the water being substantially free of toxic heavy metals; providing light; culturing at least one aquatic species in a containment area comprising the water; and harvesting the aquatic species. The aquatic species can be duckweed. The harvesting step can be done when a density of the aquatic species is at an optimum harvest density. The water can be fresh, brackish, or saline. In embodiments with brackish or saline water, the floating aquatic species can be a salt-tolerate species. The harvested aquatic culture can be processed to extract protein and/or the biomass can be used for fermentation into alcohol, pyrolysis into high value fuels, or combustion for energy.

A preferred embodiment of the invention provides an apparatus for culturing aquatic species comprising: a container configured to contain the aquatic species in sufficient culture medium to permit normal growth of the aquatic species, wherein the container has a configuration allowing the culture medium to flow in a continuous loop; a propulsion mechanism configured to apply sufficient force to the culture medium to cause motion thereof; and an automated harvest system configured to permit harvest of the aquatic species without ceasing the motion.

Another embodiment of the present invention provides an apparatus for culturing aquatic species comprising: a container configured to contain the aquatic species in sufficient culture medium to permit normal growth of the aquatic species, wherein the container is divided into growth cells by dividers; a wind barrier apparatus mounted on at least some of the dividers and configured to reduce a force applied to the aquatic species by wind; and an automated harvest system configured to permit harvest of the aquatic species.

In a further aspect of either embodiment, the container is configured to permit ambient light to reach the aquatic species.

In a further aspect of either embodiment, the container is open at the top thereof.

In a further aspect of either embodiment, the aquatic species is selected from the group of genera consisting of *Spirodela, Landoltia, Lemna, Wolffia*, and *Wolfiella*.

In a further aspect, the aquatic species is duckweed.

In a further aspect of either embodiment, the container is configured to permit a culture medium depth within a range of approximately 10 to approximately 50 cm.

In a further aspect of either embodiment, the container comprises a plastic-lined pond.

In a further aspect of the former embodiment, the container comprises peripheral walls, and the apparatus additionally comprises a wind barrier apparatus mounted on at least some of the peripheral walls and configured to reduce a force applied to the aquatic species by wind.

In a further aspect, the wind barrier apparatus comprises a mesh curtain having a height within a range of approximately 50-100 cm.

In a further aspect, the height is within a range of 70-80 cm.

In a further aspect, the curtain comprises knitted plastic.

In a further aspect, the propulsion mechanism is selected from the group consisting of a paddle wheel and a pump eductor.

In a further aspect, the propulsion mechanism is a paddle wheel, and the apparatus additionally comprises a control mechanism configured to control the rotational speed of the propulsion mechanism within a range of from approximately 0 rpm to approximately 2 rpm.

In a further aspect, the motion is within a range of 0.01-0.10 m/s.

In a further aspect, the harvest system comprises a conveyor belt configured to be movable into the culture medium, whereby a portion of the aquatic species is removed from the container.

In a further aspect, the harvest system comprises a surface skimmer mechanism.

In a further aspect, the harvest system comprises a mechanism for recycling culture medium to the container.

In a further aspect, the apparatus additionally comprises a sensor configured to monitor a physical value within the culture medium and to indicate a need to take an action when the physical value is outside preset parameters.

In a further aspect, the apparatus additionally comprises a nutrient tank in fluid communication with the container, wherein the physical value is the level of a nutrient within the culture medium, and the action is dispensing the nutrient to the culture medium.

In a further aspect, the nutrient is selected from the group consisting of nitrogen, phosphorous, potassium, carbon dioxide, and a micronutrient.

In a further aspect, the physical value is pH, and the action is the addition of an alkaline salt to the culture medium.

In a further aspect, the apparatus additionally comprises a sprinkler system configured to apply a mist of an aqueous solution across the width of the container.

In a further aspect, the apparatus additionally comprises a sensor configured to monitor the thickness of a floating mat of the aquatic species and to indicate a need to engage the harvest system when the mat reaches a preset thickness.

A preferred embodiment of the invention provides a method of culturing an aquatic species, comprising: providing an apparatus in accordance with one of claims 1 and 2; placing a culture medium within the container; introducing the aquatic species into the culture medium; and harvesting the aquatic species.

In a further aspect, the apparatus additionally comprises a sensor configured to monitor the thickness of a floating mat of the aquatic species and to provide a signal when the mat reaches a preset thickness; and harvesting the aquatic species comprises engaging the harvest system in response to the signal.

In a further aspect, the aquatic species is selected from the group of genera consisting of *Spirodela, Landoltia, Lemna, Wolffia,* and *Wolfiella.*

In a further aspect, the aquatic species is duckweed.

In a further aspect, the culture medium is selected from the group consisting of fresh water, brackish water, and saline water.

DETAILED DESCRIPTION

Aquatic species, such as, for example, duckweed, watermeal, mosquito fern, salvinia, water lettuce, and the like, due to their high cellulose and hemicellulose contents, can be processed to generate fuel and high value chemicals and materials. Processing of aquatic species can be accomplished by a range of methods or combinations of methods depending upon the desired end products and/or intermediates.

Figure 1:
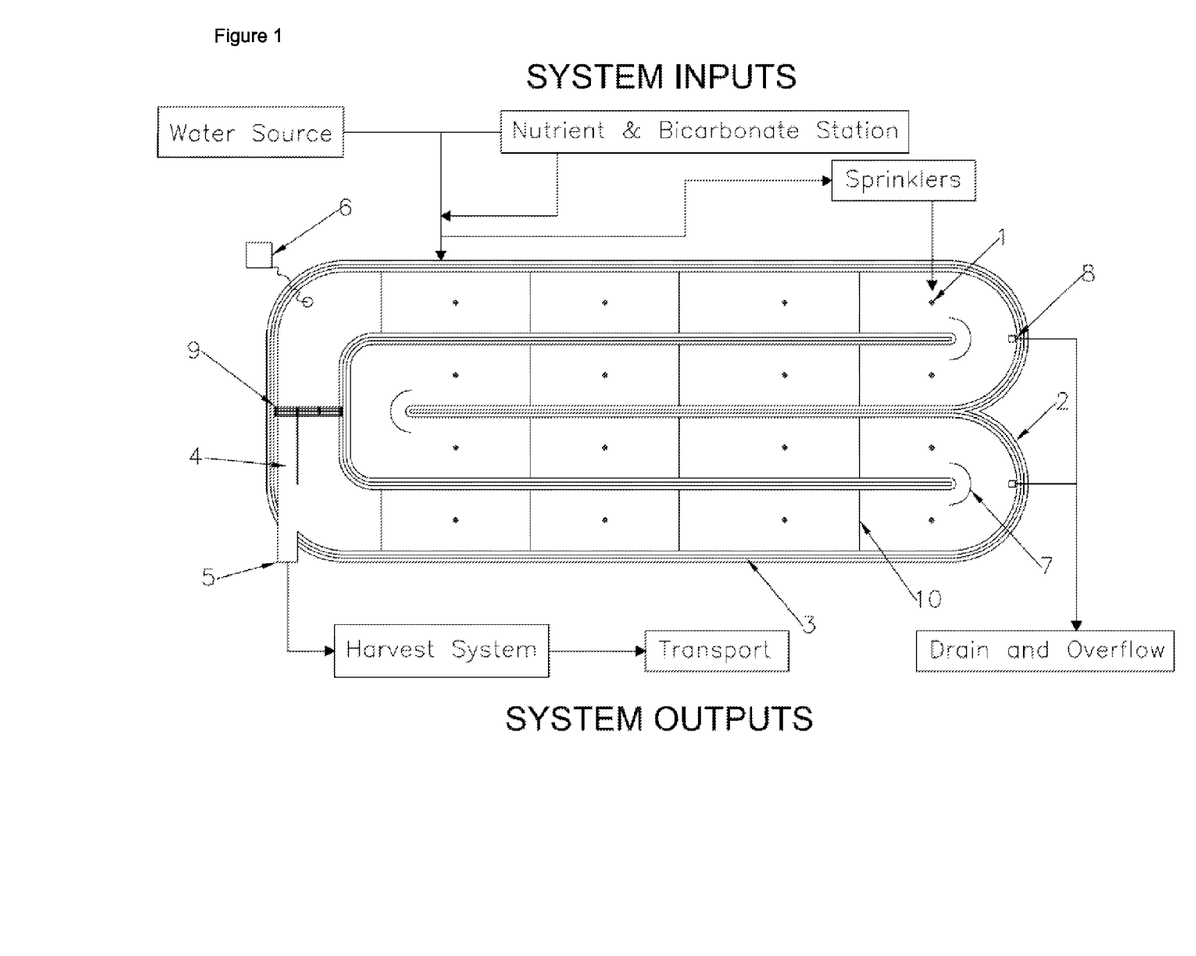

In particular embodiments, a serpentine raceway growth system (or single raceways) is provided that comprises a plastic lined shallow pond with dividing walls or meandering channels. It has a propulsion system comprising a shaft paddle wheel to move the water along with the floating microcrop to an in-situ harvest point as shown in FIG. 1. The raceways are engineered or configured for recycling the culture medium (also referred to as liquid for simplicity), and varying liquid flow rates in a controlled manner to maintain uniform *Lemna* distribution throughout the productivity area. As the microcrop grows it can develop a floating mat on the water's surface which can get thicker. This thickness can be closely monitored by aerial photo images and sensors located in strategic areas in the raceways. Systems and methods for carrying out such imaging are disclosed in U.S. Provisional Application No. 61/186, 349 entitled "Vegetation Indices for Measuring Multilayer Microcrop Density and Growth," filed on Jun. 11, 2009, which is incorporated by reference in its entirety into the present application. In particular embodiments, strategic areas include areas of the productivity area that are representative of the growth of the microcrop in the growth system. In such embodiments, for example, areas where the floating mat of the microcrop tends to pile up or thicken greatly, or areas where there is little microcrop as a result of the local configuration of the growth system, would not be selected as strategic areas for the placement of sensors or for aerial imaging. The automated harvest system can receive feedback from these sensors to regulate the frequency and amount of harvested *Lemna*. This automatic process can help maintain the productivity of the *Lemna* under optimum growth rate conditions.

In this embodiment, the raceway growth system is a modular design containing four joined serpentine raceways or four single raceways. In a particular embodiment, the footprint area for a single raceway is about 2.50 hectares (hereinafter referred to as ha) and about 10 ha per module. In this embodiment, a single raceway measures about 518 m long with four channels each about 12 m wide and with an operational volume of about 7,620 $m^3$ at a water depth of about 30 cm. The perimeter and central dividing walls (or "berms") are formed using compacted dirt removed during earth work. In a specific implementation of this embodiment, a plastic 30 mil (i.e., about 0.76 mm thickness) high density polyethylene (HDPE) liner covers the flat bottom and sloping side walls to protect the liquid culture contacting the ground elements, extending the life of the berms from wave action. Also the liner helps avoid water losses via seepage and groundwater contamination. As used herein, "about" indicates ±20% variation of the value it describes. It is understood that the specific dimensions described herein are for illustration purposes and are not intended to limit the scope of the application. Merely by way of example, a single raceway can be at least about 0.5 ha, or at least about 1 ha, or at least 1.5 ha, or at least about 2 ha, or at least about 2.5 ha, or at least about 3 ha, or at least about 3.5 ha, or at least about 4 ha, or at least about 4.5 ha, or at least about 5 ha, or at least 5.5 ha, or at least about 6 ha, or at least about 6.5 ha, or at least about 7 ha, or at least about 7.5 ha, or at least about 8 ha, or at least about 8.5 ha, or at least about 9 ha, or at least about 9.5 ha, or at least about 10 ha. A single raceway can be smaller than about 50 ha, or smaller than about 40 ha, or smaller than about 30 ha, or smaller than about 25 ha, or smaller than about 20 ha, or smaller than about 15 ha, or smaller than about 10 ha, or smaller than about 8 ha, or smaller than about 6 ha, or smaller than about 5 ha, or smaller than about 4 ha, or smaller than about 3 ha, or smaller than about 2 ha, or smaller than about 1 ha. A single raceway can measure at least 10 meters long, or at least 20 meters long, or at least 50 meters long, or at least 100 meters long, or at least 150 meters long, or at least 200 meters long, or at least 250 meters long, or at least 300 meters long, or at least 350 meters long, or at least 400 meters long, or at least 450 meters long, or at least 500 meters long, or at least 550 meters long, or at least 600 meters long, or at least 650 meters long, or at least 700 meters long, or at least 750 meters long, or at least 800 meters long. A single raceway can include 1, 2, 3, 4, 5, 6, 7, 8, 9, 10 or more than 10 channels. Each channel can be from about 0.5 meters to about 50 meters, or from about 1 meter to about 40 meters, or from about 2 meters to about 30 meters, or from about 3 meters to about 30 meters, or from about 4 meters to about 25 meters, or from about 5 meters to about 20 meters, or from about 6 meters to about 18 meters, or from about 7 meters to about 15 meters, or from about 8 meters to about 15 meters, or from about 9 meters to about 12 meters. The water depth in a single raceway can be from about 1 centimeter to about 100 centimeters, or from about 2 centimeters to about 80 centimeters, or from about 5 centimeters to about 70 centimeters, or from about 8 centimeters to about 60 centimeters, or from about 10 centimeters to about 50 centimeters, or from about 15 centimeters to about 40 centimeters, or from about 20 centimeters to about 30 centimeters. The water depth in a single raceway can be less than about 200 centimeters, or less than about 180 centimeters, or less than about 150 centimeters, or less than about 120 centimeters, or less than about 100 centimeters, or less than about 90 centimeters, or less than about 80 centimeters, or less than about 70 centimeters, or less than about 60 centimeters, or less than about 50 centimeters, or less than about 40 centimeters, or less than about 30 centimeters. A module can include 1, 2, 3, 4, 5, 6, 7, 8, 9, 10 or more than 10 single raceways.

Ground water, surface water, and reused water are acceptable for the growth of the *Lemna* as long as they meet biological and chemical growth criteria. A series of treatment ponds with floating aerators and in line UV light can help condition the water for proper reuse in the growth ponds. Water quality sensors on the discharge water pipeline can control the treatment process and monitor the water quality.

Raceway Components

Paddle Wheel

The raceway contains a propulsion mechanism to cause the aqueous culture medium to move along with the cultured microcrop. In a particular embodiment, the mechanism comprises a paddle wheel that comprises three metal wheels each about 3.8 m long by about 1.82 m in diameter. Each wheel has eight galvanized blades, about 3.8 m long by about 41 cm and attached to a main about 15.24 cm shaft by a series of metal angular. The blades have a clearance of about 2.54 cm on the sides and bottom to improve water circulation. An about 1 HP (horse power) motor connected to a 500:1 gear box provides the power to the paddle wheels and the speed is controlled via a Variable Frequency Drives (VFD) connected to a Programmable Logic Controller (PLC). The velocity of the paddle wheel varies from about 0 rpm to about 2 rpm to provide gentle *Lemna* movement on the water surface from 0 m/s to 0.3 m/s, and more preferably within a range of 0.01 m/s to 0.10 m/s. The velocity will be a function of operational conditions such as harvest and addition of nutrients, as well as weather parameters such as wind and solar radiation. The control of the paddle wheel is via Human-Machine Interface (HMI) connected to the PLC. In a specific embodiment, the HMI comprises a series of displays that aggregate data received from the PLC and show the operation of the system. The water velocity in all raceways has a default diurnal operational speed of about 0.05 m/s.

Pump Eductor

In an alternative embodiment, the propulsion mechanism comprises pump eductors that are located under the water along the width of the channel. In a specific embodiment, upstream water is pumped with an about 4 HP high pressure centrifugal pump to a common manifold containing about 20, about 9.5 mm eductors evenly spaced. To control the water velocity, a butterfly valve connected to the PLC and control by a pressure transducer on the pump discharge regulates the water flow and pressure at the eductors.

Windbreak Curtains

In particular embodiments, knitted plastic mesh can be used as windbreak curtains to prevent compaction of the *Lemna* due to high winds. The plastic mesh can have about 50% porosity openings to reduce the wind turbulence and to allow light penetration. The windbreak curtains can have a height of about 76 cm and they are installed on top of the perimeter and central dividing walls. The curtains are attached to three about 12.5 ga cables which are supported on galvanized T-posts located about every 6 meters.

Windbreak curtains are also installed on floating structures to reduce the winds parallel to the raceway channels. Here, solid curtains made of the same plastic liner (30 mil HDPE) can be attached to a rectangular PVC pipe frame which is mounted on top of four PVC floating cylinders. The curtains measure about 76 cm by about 12 m with an air gap at the bottom of about 5 cm from the water level. The about 5 cm gap can allow a portion of the air to flow under the curtain and will help reduce the wind vortex downstream. This can allow more distance between the installations of the curtains. The floating curtains can be attached to two under water cables that extend the same length of the raceway channels.

Nutrient System

A special blend of fertilizers with the right amount and ratio of Nitrogen, Phosphorus, and Potassium as well as micro nutrients can be maintained at high concentration in the nutrient tanks. Sensors located in each module can monitor the level of nutrients and can control the dosing of nutrients via the HMI. Each nutrient station can have a concentrated nutrient tank connected to a dosing posing pump. When the level of a nutrient is below the set point in the HMI, the dosing pump is activated and will add concentrated nutrient to each raceway in each module at strategic locations to maintain uniform levels throughout the raceways. Depending on the dosing amounts and growth seasons, nutrients can be added via the underwater pipes or sprinkler system.

Another parameter that can be closely monitored and controlled in the growth reactors is the pH and/or the carbon dioxide concentration. As with the nutrient system, each module can have at least one pH sensor and/or at least one carbon dioxide sensor. A pH sensor and/or a carbon dioxide sensor can be used in tandem to indicate the need for adjustment by the addition of carbon dioxide in the liquid or gas phase and an alkaline salt such as sodium bicarbonate. The supply for carbon dioxide can be a commercial carbon dioxide pure gas, a blend and readily available flue gas.

Sprinkler Systems

Sprinklers can be installed on the channels to cool down the *Lemna* to avoid excessive heating during hot weather. When the air temperature is high, the water sprinklers can turn on to distribute an even water mist across the width of the channel. Because the *Lemna* in the channel are constantly moving, the entire *Lemna* mat surface can receive a water mist. The sprinkler system can also be used to compensate for water lost during evaporation, growth and harvest. As mentioned above, the nutrient system can also be connected to the sprinkler line as an option to add nutrients over the mat surface evenly. The sprinkler system can be controlled by electric solenoid valves connected to the PLC; in a specific embodiment, these valves are about 2.5 cm in diameter.

Inoculation

In a particular embodiment, once the raceways have been set up with the operational water depth and nutrients, fresh acclimated wet *Lemna* is brought in from inoculation ponds located nearby the production raceways. An inoculation density of 600 g/m$^2$ will be used to estimate the mass of *Lemna* manually placed on each raceway. As the *lemna* starts growing in the raceways, a portion is manually transferred to adjacent raceways and the process is repeated until all raceways are completely inoculated.

Utility Supply Line

In an embodiment, the main supply line for water, nutrients, and electricity is located between the modules to facilitate the installation and distribution to each raceway. Each module has a supply matrix with connections for water, nutrient, and sensors for monitoring raceway performance. Electrical solenoid valves can control the addition of water and nutrients to the raceways. In a particular embodiment, all solenoid valves are rated 24 Vdc with a minimum CV of 22 to avoid high pressure losses. In this embodiment, the main distribution pipe diameter for the water and nutrient headers are about 250 mm and about 110 mm, respectively. The diameter for the supply branches for the water, nutrient, and sprinkler pipes are about 160 mm, about 25 mm, and about 110 mm, respectively.

Drain and Overflow

In a specific embodiment, each 2.5 ha raceway has two drain sumps and two emergency spillways on top of the berm for excess water overflow. In this embodiment, each drain box measures about 1.5 m×about 1.5 m and is connected to an about 200 mm drain pipe. A pneumatic knife drain valve can control the gravity flow to a common canal. This canal can be located at the end of the raceways and it can also serve the emergency overflow. Water from the canal can drain by gravity to an earthen pond where it can be stored and treated for further reuse in the growth reactors.

Harvest System (Conveyor Belt)

In a particular embodiment of the harvest system, an aerial photo scan and a local sensor located on the raceway monitor the thickness of the floating mat and activate the harvest process. An about 13 m harvest channel wall extends from the end of the first section of the paddle wheel pushing the *Lemna* mat towards the conveyor belt. During harvest, the speed of the water increases to 0.1 m/s to reduce the harvest operation time. A conveyor belt located at the end of the wall is automatically lowered into the water below the *Lemna* mat. The *Lemna* mat flows through about 11 m of the harvest channel in which section of the channel two mechanical arms funnel the *Lemna* to the conveyor belt. The remaining *Lemna* flows through the other 2 sections of the paddle wheel allowing the *Lemna* to evenly redistribute itself. The conveyor belt collects the floating *Lemna* mat and transports the *Lemna* to a shared screw auger that transfers all the *Lemna* from two adjacent raceways to a collection wagon. Excess water drained from the belt and auger is collected and drained back into the raceways. An automated system and a series of algorithms on the PLC can synchronize the speed of the belt and paddlewheel rotation to control the harvest rate and frequency. When the harvest amount is collected, a weight sensor located on the collection wagon communicates with the harvest system to stop harvesting and to bring the paddle wheel speed to normal operational mode. The tractor operator receives a signal when a wagon is full and ready to transport the dewatered *Lemna* biomass to the process building for the bioconversion process.

Harvest System (Skimmer)

In another embodiment of the harvest system, an aerial photo scan and a local sensor located on the raceway monitor the thickness of the floating mat and activate the harvest process. An about 13 m long harvest channel wall extends from the end of the first section of paddle wheel pushing the *Lemna* mat towards a harvest skimmer. The *Lemna* mat flows through about 11 m of the harvest channel width, in which section of the channel two mechanical arms funnel the *Lemna* down to a channel width of about 2.75 m, at which width a surface skimmer is located. During harvest the skimmer is positioned so that the top 2.54 cm is skimmed and the rest of the water flow travels under the skimmer and back into the normal flow of the raceway. The harvest skimmer is about 2.75 m wide by about 61 cm deep made from aluminum sheeting, polyvinyl chloride (PVC) and Styrofoam insulation. Each skimmer has six about 46 mm wide funnels that bring the *Lemna* to a about 127 mm×about 76 mm PVC reducing coupling. The skimmer is designed in a way that can optimize the percent solids harvested, minimizing the mass of water that needs to be processed. This is done by skimming the water twice, once at the front of the skimmer using the aluminum plate and again at the raised edge of the PVC coupling. A slotted about 12 mm PVC pipe is mounted at the front aluminum plate, and engages with the edge of the plate, preventing the skimming action from sucking sub-surface water. The six PVC couplings are then attached to a common drain pipe via a pipe having an inner diameter of about 110 mm. Opening an automated knife on the drain pipe starts the skimming process. The common drain transports the *Lemna* and water mix out of the raceway via gravity to a common open channel which is connected to all raceways in the module. The *Lemna* water mix from all raceways is collected and removed by a single conveyor belt. The conveyor belt dumps the *Lemna* into a wagon which transports the *Lemna* to the process area. The water is then pumped back into the raceway at the same rate at which the water is being skimmed from the raceway. This is done via level switches connected to PLCs. When harvesting is completed the return pump is shut off and the knife valve closes, stopping the skimming process and filling the skimmer with water. The skimmer is then pulled to the bottom of the raceway to allow *Lemna* to flow through for normal growing operation. The common drain transports the *Lemna* and water mix out of the raceway via gravity to a common open channel which is connected to all raceways in the module. By gravity, the water and floating *Lemna* in the open channel then flows into a harvest sump. The sump has a receiving section for the *Lemna* and an overflow section for the water. A conveyor belt located in the receiving section collects the *Lemna* and transports it to a wagon. An about 50 HP high volume pump transfers the water back into the raceways. This pump is also used to push any remaining *Lemna* on to the conveyor belt. The skimmers, drain knife valve, conveyor belt, and return pump are all connected to the PLC to control the harvest operation. Weight sensors located in each wagon communicate with the PLC to stop the harvest process. When harvesting is completed the return pump is shut off and the knife valve closes stopping the skimming process and filling the skimmer with water. The skimmer is then pulled to the bottom of the raceway to allow the *Lemna* to flow through for normal growing operation.

In particular embodiments, the growth performance of the *Lemna* is maintained at optimum conditions via a series of sensors that monitor the pH, temperature, ammonia, and weather parameters. All the monitoring information is fed to a central human machine interface that controls the growth and harvest process. A sophisticated computer model predicts any growth problems and alerts operators to proceed with preventive actions to minimize down time periods.

The raceway system described above offers particular advantages. The raceway systems combine a dynamic and static hydraulic option that allows the water and *Lemna* to move very gently to a single harvest point. The motion of the water and *Lemna* can help maintain homogenous nutrient and temperature distribution throughout the floating *Lemna* mat and water interface. This can help reduce the nutrient boundary between the *Lemna* roots and the water. Another advantage of low velocity is to help maintain the *Lemna* mat uniformly on the surface, especially redistribution during windy conditions. The paddle wheel system is an effective and economical form of moving a large volume of water in a closed loop with low power consumption. Since the *Lemna* moves, a single harvest point can be strategically installed in the raceways so that a small amount of power is used to collect and transfer the *Lemna* (not the water) to a collection point.

Static Floating Grid Bioreactor

The floating grid system is a static design in which the *Lemna* is contained in floating cells with curtains to avoid *Lemna* compaction due to wind and wave action. In a particular embodiment, each cell measures about 6 m×about 6 m with a plastic curtain that can extend about 30 cm from the top of the water. High capacity pumps can be used to recirculate the liquid and to add the nutrients via a submerged array of pipes that extends throughout the bottom of the ponds. In such an embodiment, more power is employed to maintain uniform nutrients and temperature distribution. The harvest process can be performed by installing a skimmer funnel in each cell, about 44 skimmers per ha. The skimmer funnels are suspended from the intersection of four cells such that the rim of the skimmer will remain submerged at about 2.5 cm regardless of any change in liquid level. During harvest, the floating *Lemna* and water can be sucked through four skimmers at a rate of about 160 gpm for about 30 min and can be transferred to a dewatering station where a vibrating screen separates *Lemna* from the water. The water can be then pumped back with another high capacity pump into the production pond. Since only about 1% of *Lemna* is contained in the about 160 gpm, large volumes of water and energy can be used during the harvest process. The *Lemna* mat uniformity among all the cells can be different as a result of the difference in suction rate caused by the wind, *Lemna* mat thickness, and redistribution.

As used herein, "biomass" is a mass with a substantial carbon content. Biomass can include or be derived from algae; aquatic species such as, for example, duckweed; certain plastics or other organic wastes; conventional feedstock for pyrolysis in oil refinery; agricultural wastes or by-products such as, for example, silage, manure, and the like; or a mixture of some or all of the materials mentioned above.

Embodiments of the invention include methods of growing floating aquatic species that can be useful as fuel, food, fertilizer, and/or for bioremediation. Certain embodiments provide methods for extruding proteins from wet biomass without corresponding loss of carbohydrates.

In some embodiments, the floating aquatic species are grown as a substantial monoculture. In other embodiments the floating aquatic species are grown in a mixed culture with other plants. In still other embodiments, floating aquatic species are grown as part of a complex ecosystem that comprises one or more additional animal, plant or protist. In yet another embodiment, floating aquatic species are grown in an axenic culture.

In some embodiments, the floating aquatic species are grown in direct exposure to sunlight. In other embodiments the floating aquatic species are grown in indirect light. Other conditions can be selected and/or varied to support rapid growth, desirable protein profiles and/or carbohydrate production, and the like. Among these are the factors listed in Table 1.

In some embodiments, the nitrogen source used to promote the growth of the floating aquatic species is comprised of animal waste, such as cow dung or pig waste and the like. In other embodiments, the nitrogen source is urea. In still other embodiments, the nitrogen source is biogas plant slurry. The reactor can be fitted with heating elements and/or a cooling system in order to regulate the temperature of the growing plants. In some embodiments, the reactor is surrounded by wind shields to prevent or reduce compacting of the floating plants that can be caused by wind. The wind shields can be permeable to light necessary for the growth of floating aquatic species.

In some embodiments, the reactor supporting the growth of the floating aquatic species is physically divided into discrete sections, such that individual growth cells are created. In certain embodiments, the material forming the reactor divisions is metal, plastic, rubber, or combinations thereof. For example, a network of floating baffles can interfere with the free flow of floating plants to avoid compacting/piling caused by wind and maintain uniform distribution of the plants across the surface of the culture medium. Uniform density of cultured plants can increase the productivity of the reactor due to increased light received by the culture, and more effective nutrient distribution to and waste removal from the culture. Uniform density of cultured plants can increase the accuracy of culture density measurements.

The harvested biomass comprising the aquatic species can be processed into two components: a carbohydrate-rich solid phase and a protein-rich liquid phase, also referred to as a juice. The process can be achieved using a screw press, a belt press, a knife mill, or the like, or a combination thereof. Merely by way of example, the harvested biomass can be lysed in a knife mill. As used herein, "lysing" biomass encompasses mechanical or chemical processes that disturb the organization of the organism on the level of individual cells or multicellular structures, so as to render the carbohydrates, proteins, and micronutrients present in the biomass organisms more available for downstream processing to purified protein, carbohydrate-containing materials, or micronutrient-containing fluids. Lysing can include, for example, chopping, shredding, smashing, pressing, tearing, lysis by osmotic pressure, or chemical treatments that degrade biological structures. The lysed biomass can be pressed in a belt press to generate a juice and a first solid phase; and the first solid phase can be pressed in a screw press to generate more juice and a wet material, referred to as "bio-crude." The wet bio-crude can comprise the carbohydrate-rich solid phase, and can be processed further. The juice generated in different pressing procedures can be combined for further processing.

The wet bio-crude may be processed based on considerations, such as, for example, suitability for further applications. Merely by way of example, the bio-crude can be dried to be used as a power plant feedstock. In other embodiments, the bio-crude can be optimized via pelletization or the like for co-combustion with other hydrocarbon-based fuels, such as coal. In other embodiments, the bio-crude is used as a feedstock for biofuel conversion. In other embodiments, the bio-crude is further processed using physical or chemical methods to further extract protein content.

Embodiments of the present application are further illustrated by the following examples.

EXAMPLES

The following non-limiting examples are provided to further illustrate embodiments of the present application. It should be appreciated by those of skill in the art that the techniques disclosed in the examples that follow represent approaches discovered by the inventors to function well in the practice of the application, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the application.

Example 1

FIG. 1 shows an exemplary system for culturing an aquatic species. The system comprises a container defined by a berm 2, on which are mounted windbreaks 3. The container comprises a The system can include a water source which can provide water as the culture medium, a nutrition system ("nutrient and bicarbonate station" in FIG. 1) which can provide at least one nutrient to the system, and a harvest system 5 within a harvest channel 4, in which the aquatic species is harvested. The harvested aquatic species can be transported to a processing center for further processing. A propulsion system 9 is disposed within the container, and floating windbreak 10. The system can also include sprinklers 1 (shown as solid dots) evenly distributed in a 4 by 4 matrix in the system, and a monitoring system 6 for monitoring levels of nutrients, pH, and temperature. Turning vanes 7 are placed within the curved portions of the container. The system can further include a drain and overflow system 8 (shown as the two open dots on the right). The system can include a single raceway growth systems which is about 2.5 ha. The system can culture *Lemna*.

Example 2

Figure 2:
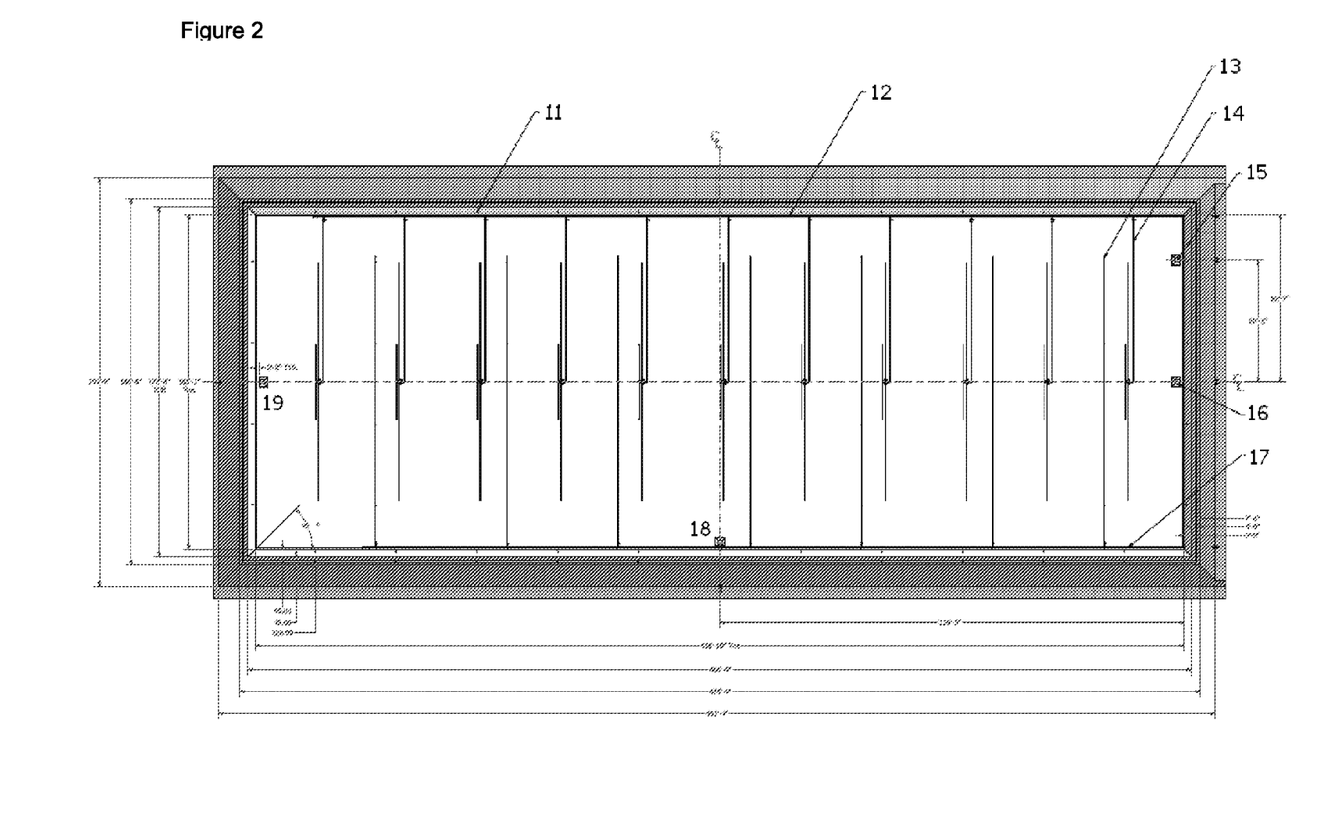

FIG. 2 shows an exemplary static system for culturing an aquatic species. The system can include support augers 11. In the exemplary system, there are thirty-four support augers. Harvest branches 14 are attached to the support auger. In the particular configuration disclosed, there are eleven harvest branches distributed in the system. The mixture of the aquatic species and the culture medium can be harvested through the harvest branches 14 and then supplied to the harvest header 12 in a controlled fashion. Harvest header 12 comprises a 6-inch PVC pipe in this embodiment. After the culture medium is separated from the harvested aquatic species, the culture medium can be delivered back to the system though a return header 17, likewise comprising a 6-inch PVC pipe, and then return branches 13. In the exemplary system, there are seven return branches in the system. The system can include one or more drain sumps 15, 16, 18, 19 for recirculating the culture medium. The dimensions or the quantity of a specific part of the system in the figure is for purposes of illustrating a particular embodiment, and is not intended to limit the scope of the application. A person of ordinary skill in the art would know that the dimensions or the quantity of a specific part of the system can be modified.

Example 3

Figure 3:
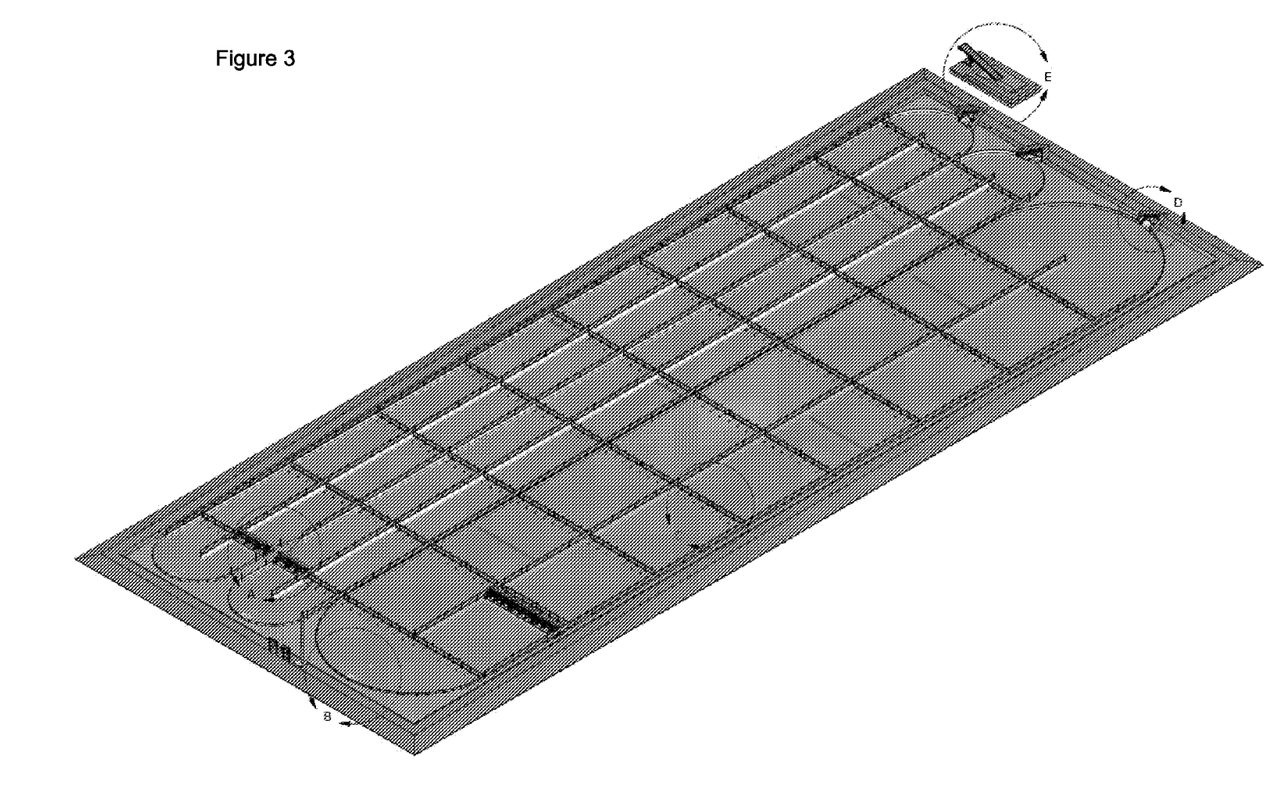

In an alternate embodiment of a raceway system, the individual raceways have an elliptical or circular configuration. FIG. 3 illustrates such a configuration, in which three such raceways are placed in a side-by-side configuration. Other embodiments are also contemplated in which a single elliptical raceway is employed, or in which two mirror-image raceways are employed. As can be seen in the figure, this raceway system comprises wind barriers that are situated on the walls or berms making up the raceways, as well as floating wind barriers.

Figure 4:
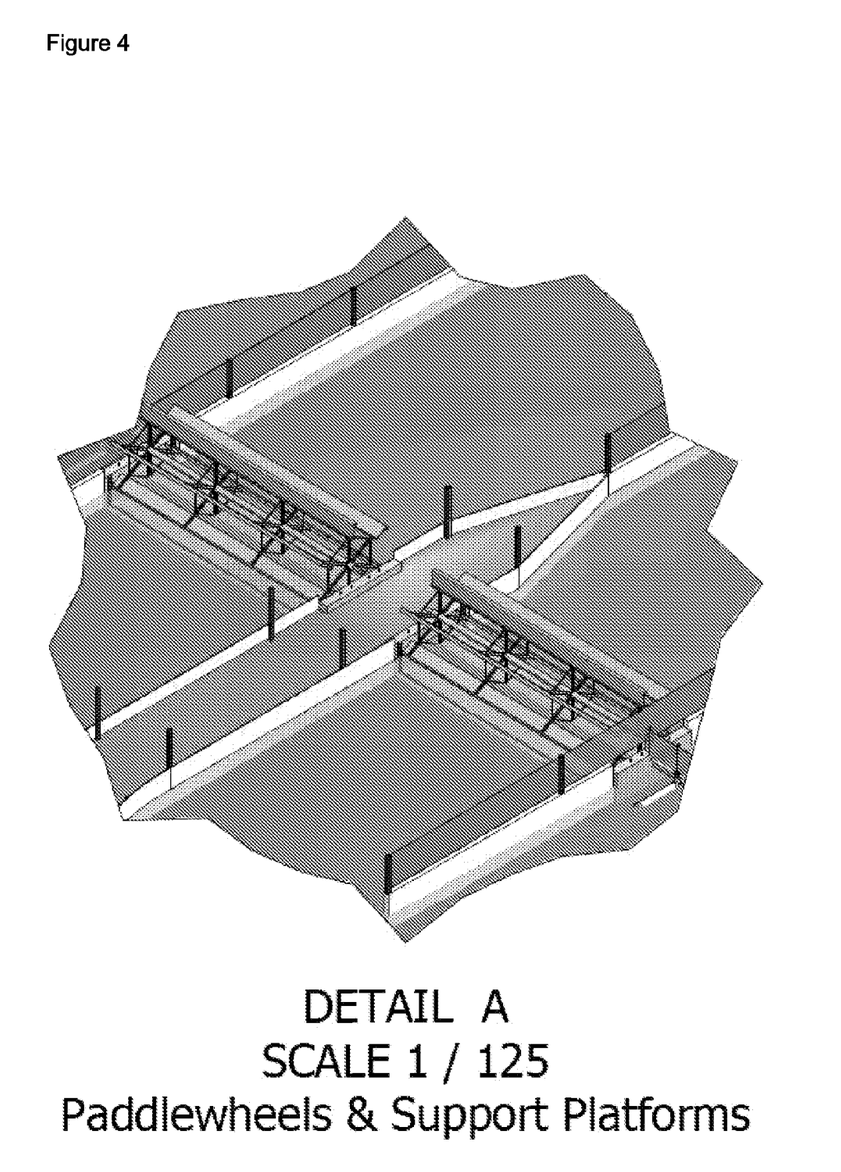
Figure 5:
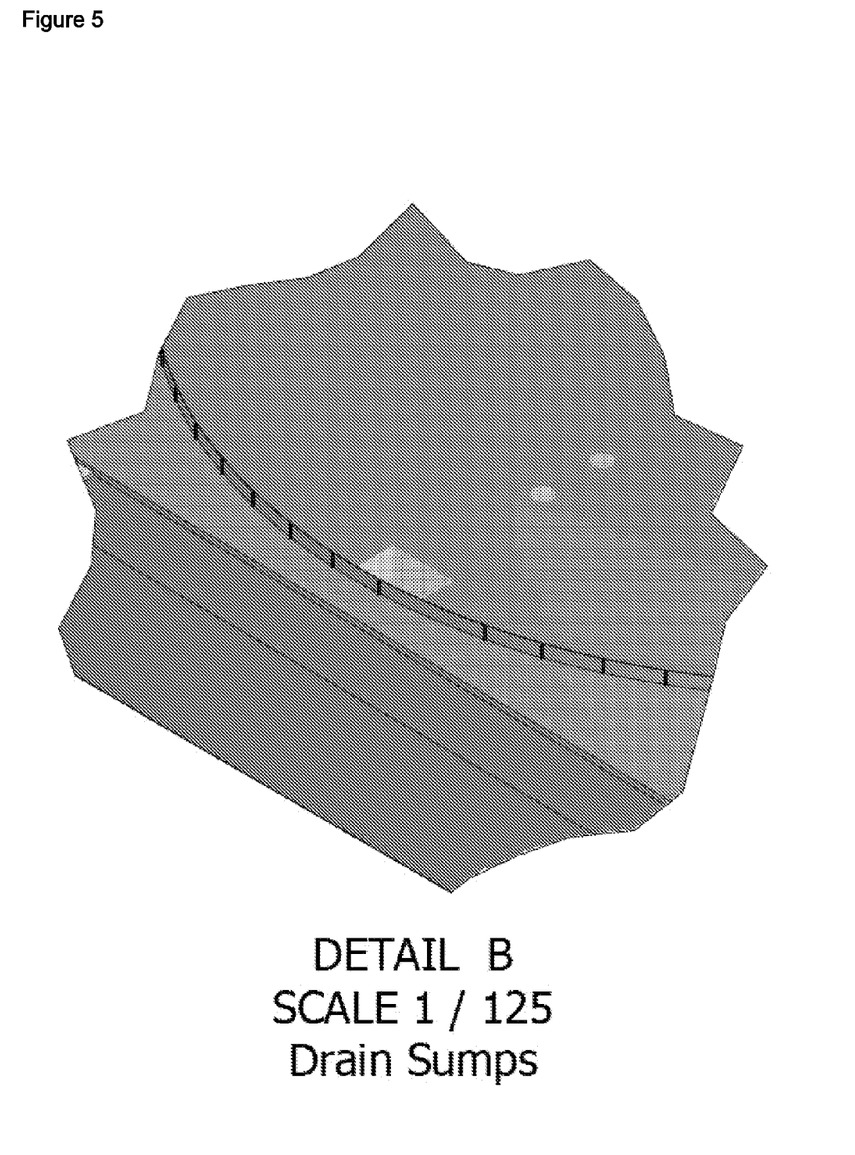
Figure 6:
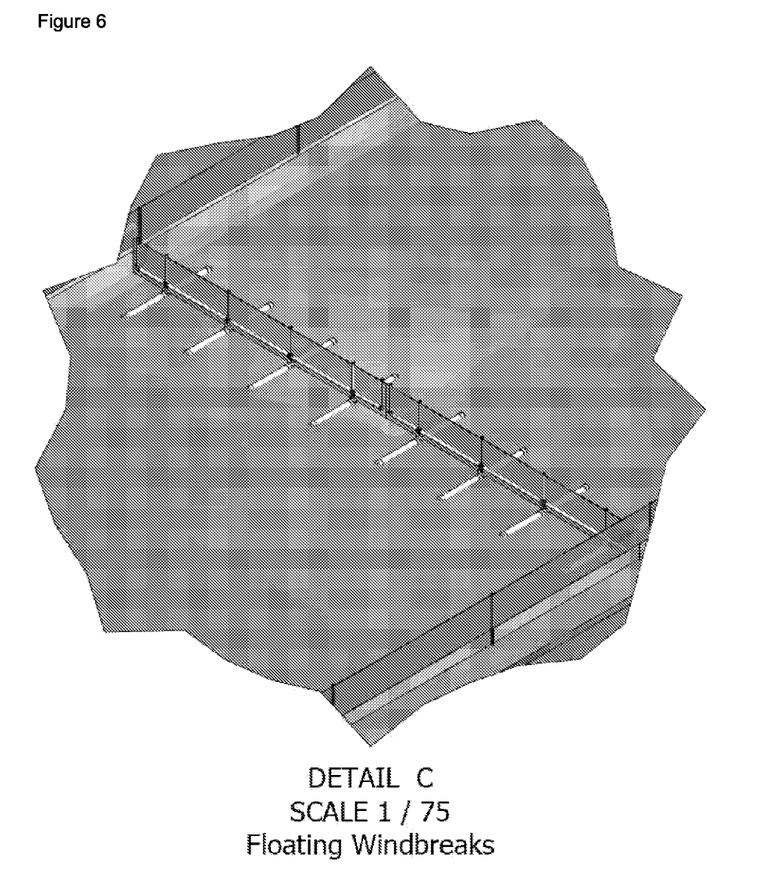
Figure 7:
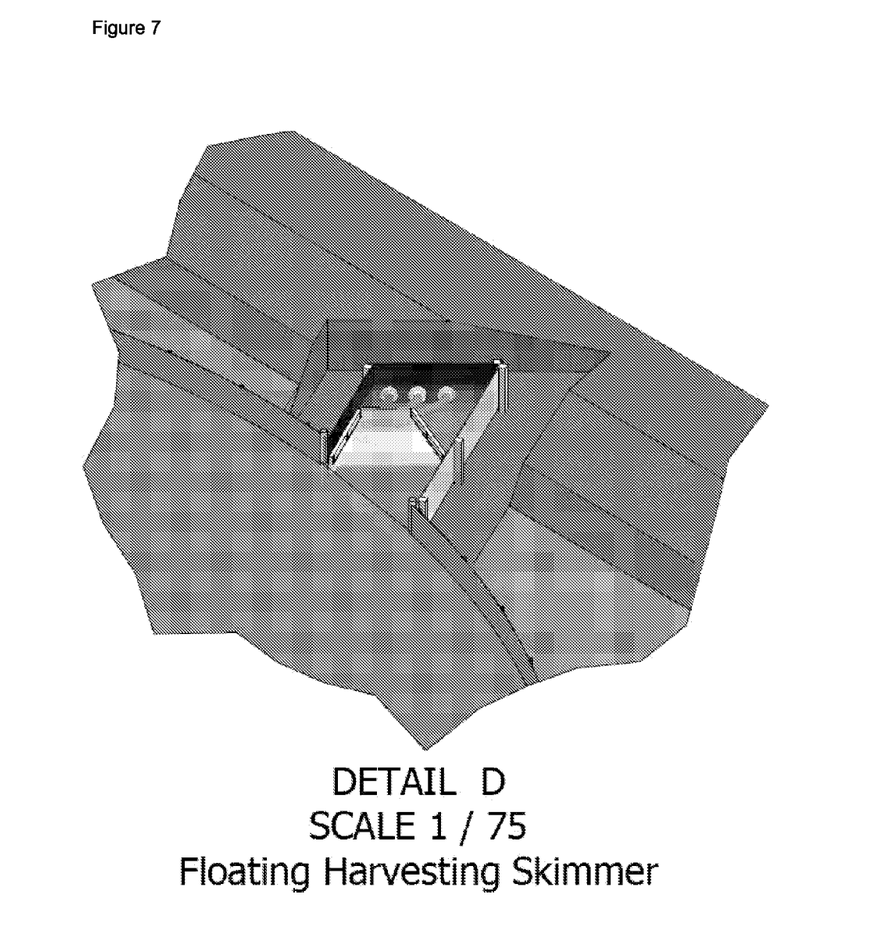
Figure 8:
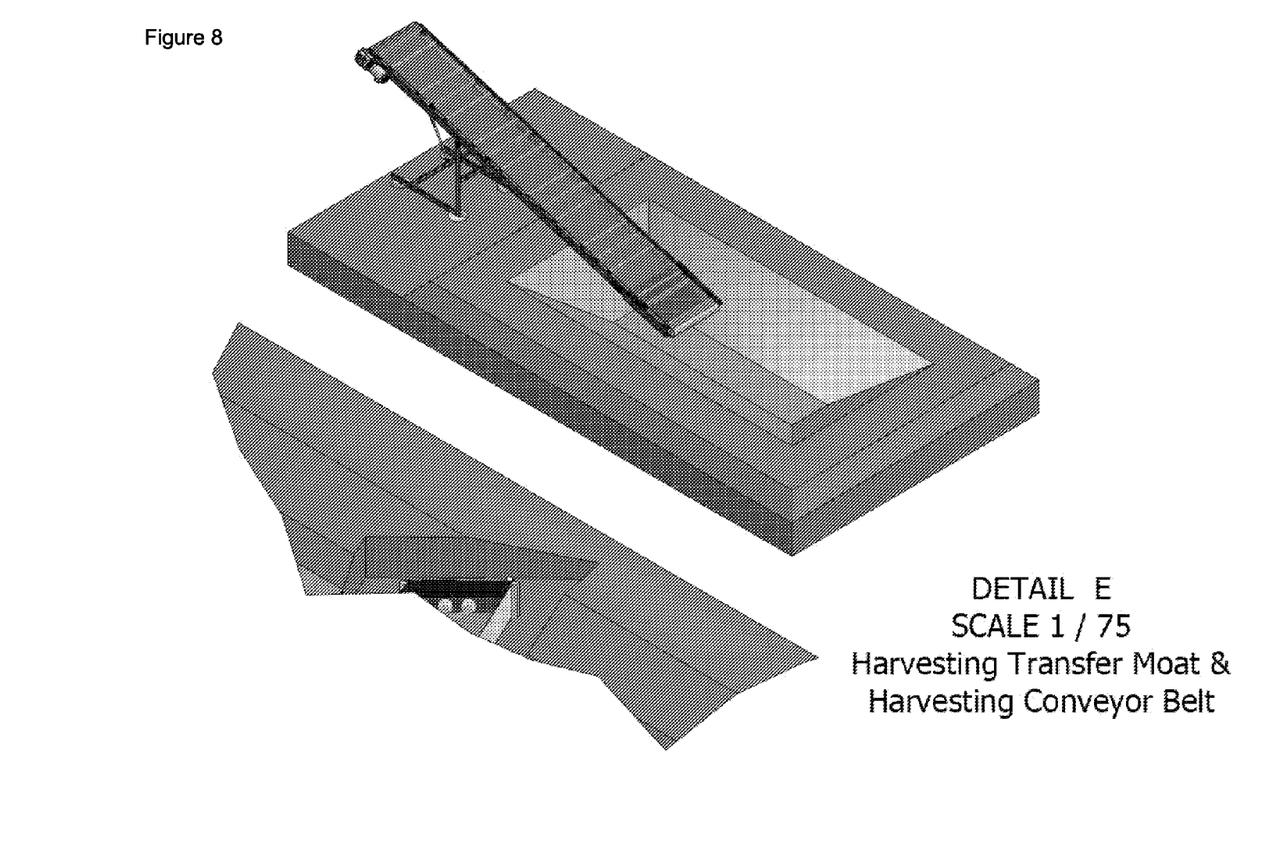

Particular features of the raceway system of this embodiment, marked with letters A-E in FIG. 3, are depicted in greater detail in FIGS. 4-8. FIG. 4 depicts the paddlewheels and support platforms. The support platforms have a concave top surface matching the curvature of the blades of the paddlewheel to more efficiently develop force. FIG. 5 depicts the drain sumps, which are similar tom those depicted in FIG. 2. FIG. 6 shows the floating windbreaks in greater detail. FIG. 7 shows the details of the floating harvesting skimmer, which in this embodiment has access to the *lemna* or other aquatic species via a break in the wall forming the raceway. FIG. 8 shows the conveyor belt-based harvesting system.

Figure 9:
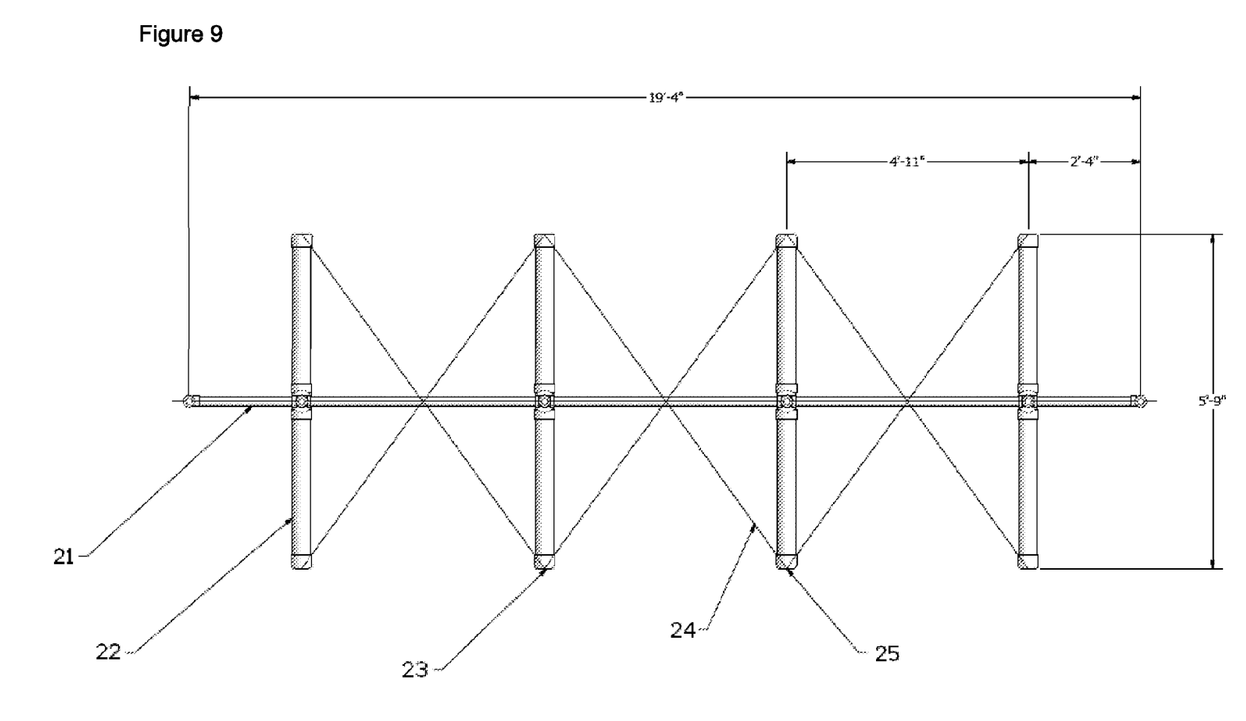

FIG. 9 is a top view of an exemplary windbreak structure. The exemplary structure comprises 2" SCH PVC pipes 21; 4" SCH PVC pipes 22; 23 indicating that the windbreak structure can float on the culture medium, e.g. water; galvanized support wires 24; and eyebolt attachments 25 indicating that support wires 24 are affixed to the eyebolts on top of the PVC pipes 22. Support wire 24 can comprise a 0.041" solid core. The support wire 24 can sustain the lateral load to the windbreak structure generated by, e.g., wind. The eyebolt attachments 25 may not compromise the float seal.

Figure 10:
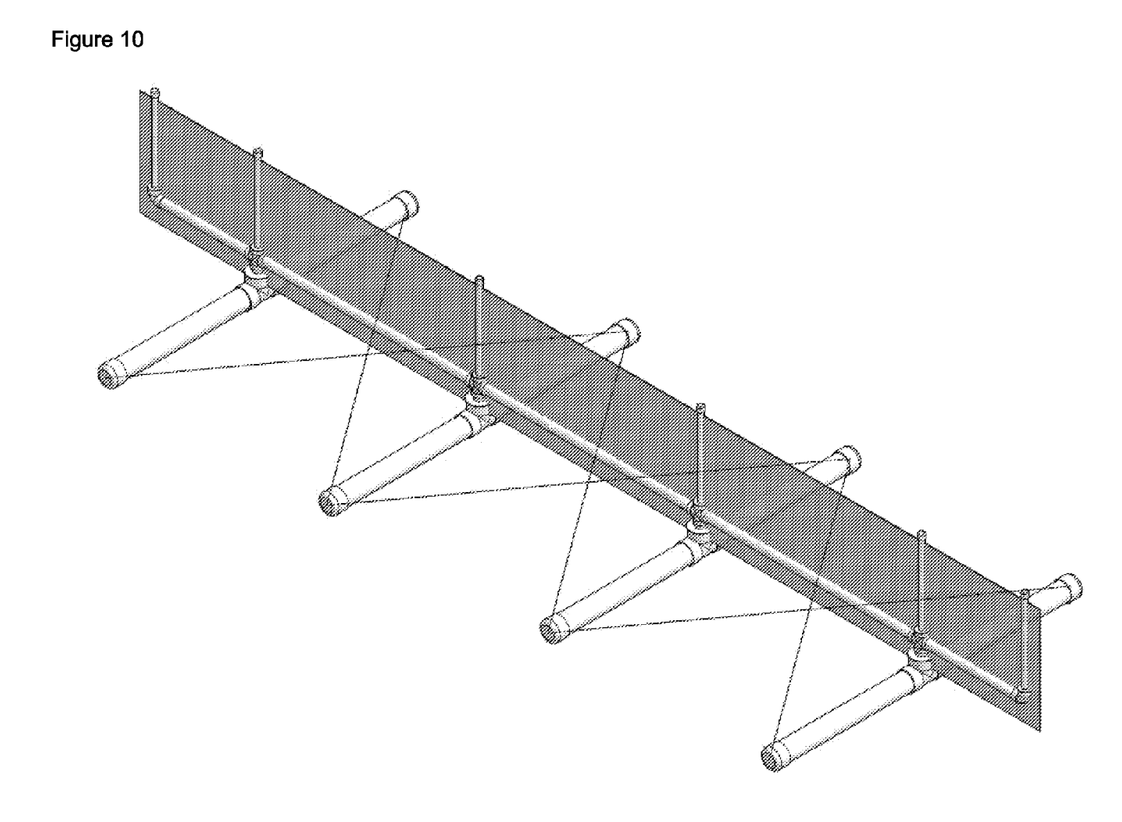

FIG. 10 is a perspective view of the exemplary windbreak structure shown in FIG. 9. The vertical pipes affixed to the PVC pipes (21 of FIG. 9) are 1" SCH 40 PVC pipes. The windbreak structure can further comprise a curtain affixed to at least one of the PVC pipes including 21 of FIG. 9, 22 of FIG. 9, or the vertical 1" SCH 40 PVC pipes. For example, the curtain can be bolted to the vertical 1" SCH 40 PVC pipes. The curtain can be overhung to existing walls, e.g. walls of the container. The curtain can be essentially rectangular.

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments.

Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the numbers expressing quantities of ingredients, properties such as molecular weight, reaction conditions, and so forth, used to describe and claim certain embodiments of the application are to be understood as being modified in some instances by the term "about" or "substantially". For example, "about" or "substantially" can indicate ±20% variation of the value it descries, unless otherwise stated. Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Preferred embodiments of this application are described herein, including the best mode known to the inventors for carrying out the application. Variations on those preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

What is claimed is:

1. An apparatus for culturing a duckweed species outdoors, the apparatus comprising:
   a container comprising a bottom, at least one peripheral wall, and a top opening,
      wherein the bottom is substantially parallel to a ground surface and intersects the at least one peripheral wall,
      wherein the at least one peripheral wall extends substantially vertically from the bottom to define the top opening of the container,
      wherein the container is configured to contain the duckweed species in sufficient culture medium to permit normal growth of the duckweed species,
      wherein the container has a raceway configuration allowing the culture medium to flow in a continuous loop, and
   a propulsion mechanism directly contacting the culture medium and configured to apply sufficient force to the culture medium to cause motion thereof,
   a first sensor configured to monitor the thickness of a floating mat of the aquatic species,
   wherein the apparatus is not enclosed such that at least the top opening is exposed to at least one weather parameter selected from the group consisting of a direct sunlight and an atmospheric wind.

2. The apparatus of claim 1 further comprising a harvest system, wherein the sensor is further configured to indicate a need to engage the harvest system when the floating mat reaches a preset thickness.

3. The apparatus of claim 2, wherein the harvest system comprises at least one of a conveyor belt configured to be lowered into the culture medium below the floating mat of the duckweed species and a surface skimmer configured to skim a top surface of the culture medium.

4. The apparatus of claim 3, wherein the surface skimmer is configured such that a top 2.54 cm of the culture medium is skimmed.

5. The apparatus of claim 2, wherein the harvest system comprises a mechanism for recycling the culture medium to the container.

6. The apparatus of claim 1 wherein the container comprises a berm, a plastic liner, or a combination thereof.

7. The apparatus of claim 1 further comprising a sprinkler system configured to distribute a water mist across a width of the continuous loop to a surface of the floating mat of the duckweed species.

8. The apparatus of claim 1, wherein the propulsion mechanism is selected from the group consisting of a paddle wheel and a pump eductor.

9. The apparatus of claim 1, wherein the motion is within a range of 0.01-0.10 m/s.

10. The apparatus of claim 1, wherein the container further comprises a wind barrier apparatus mounted on the peripheral wall and configured to reduce a force applied to the duckweed species by the atmospheric wind.

11. The apparatus of claim 10, wherein the wind barrier apparatus comprises a mesh curtain having a height within a range of approximately 50 to 100 cm.

12. The apparatus of claim 11, wherein the height is within a range of 70 to 80 CM.

13. The apparatus of claim 11, wherein the mesh curtain comprises a knitted plastic.

14. The apparatus of claim 13, wherein the knitted plastic comprises about 50% porosity openings.

15. The apparatus of claim 1, further comprising:
   a second sensor configured to monitor a physical value within the culture medium and to indicate a need to take an action when the physical value is outside preset parameters.

16. The apparatus of claim 15, further comprising a nutrient tank in fluid communication with the container, wherein the physical value is the level of a nutrient within the culture medium, and the action is dispensing the nutrient to the culture medium.

17. The apparatus of claim 1 wherein at least one of the bottom and the at least one peripheral wall comprises a berm, a plastic liner, or a combination thereof.

* * * * *